United States Patent
Poulson et al.

(10) Patent No.: US 9,348,804 B2
(45) Date of Patent: May 24, 2016

(54) METHODS AND APPARATUS TO PROVIDE A CHOICE SELECTION WITH DATA PRESENTATION

(75) Inventors: Derrek Allen Poulson, South Jordan, UT (US); John Francis Ehrenhofler, Nanuet, NJ (US); Mihai Edward Burciu, Leonardo, NJ (US); James Peter Buckton Webster, Wanchai (HK); Paul Adrian Baynton, New York, NY (US); Murina Lei Moriyama, Toronto (CA); Diana Carol Cook, New York, NY (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 1858 days.

(21) Appl. No.: 12/119,245

(22) Filed: May 12, 2008

(65) Prior Publication Data

US 2009/0282354 A1 Nov. 12, 2009

(51) Int. Cl.
*G06F 17/00* (2006.01)
*G06F 17/24* (2006.01)
*G06F 17/30* (2006.01)

(52) U.S. Cl.
CPC ........ *G06F 17/246* (2013.01); *G06F 17/30398* (2013.01); *G06F 17/30554* (2013.01)

(58) Field of Classification Search
CPC .................................................. G06Q 30/0203
USPC .......... 715/212, 200, 227, 221, 243
See application file for complete search history.

(56) References Cited

U.S. PATENT DOCUMENTS

| | | | |
|---|---|---|---|
| 5,772,585 A | 6/1998 | Lavin et al. | |
| 5,802,514 A | 9/1998 | Huber | |
| 5,809,297 A | 9/1998 | Kroenke et al. | |
| 5,835,917 A * | 11/1998 | Shin et al. | 715/209 |
| 6,411,313 B1 * | 6/2002 | Conlon et al. | 715/769 |
| 6,732,111 B2 | 5/2004 | Brodersen et al. | |
| 6,738,770 B2 * | 5/2004 | Gorman | |
| 6,931,391 B2 | 8/2005 | Tang et al. | |
| 7,539,696 B1 * | 5/2009 | Greener | G06Q 30/20 |
| 7,941,751 B2 * | 5/2011 | Ebert | 715/730 |
| 7,958,000 B2 * | 6/2011 | Luby et al. | 705/7.32 |
| 8,694,358 B2 * | 4/2014 | Tryfon | 705/7.32 |
| 2002/0152110 A1 | 10/2002 | Stewart et al. | |
| 2003/0101088 A1 * | 5/2003 | Lohavichan | 705/10 |
| 2003/0120687 A1 * | 6/2003 | Solomon et al. | 707/200 |
| 2004/0230989 A1 * | 11/2004 | Macey et al. | 725/24 |
| 2006/0161533 A1 | 7/2006 | Selca et al. | |
| 2007/0005634 A1 | 1/2007 | Selca et al. | |
| 2007/0005635 A1 | 1/2007 | Martinez et al. | |
| 2007/0061611 A1 | 3/2007 | MacKinlay et al. | |
| 2007/0083851 A1 | 4/2007 | Huang et al. | |
| 2007/0288246 A1 * | 12/2007 | Ebert | 705/1 |

(Continued)

OTHER PUBLICATIONS

Peter Hale, User Driven Modelling, Drag and Drop Programming, Aug. 3, 2007, 4 pages.

*Primary Examiner* — Manglesh M Patel
(74) *Attorney, Agent, or Firm* — Hanley, Flight & Zimmerman, LLC.

(57) ABSTRACT

Methods and apparatus to provide a choice selection with data presentation are disclosed. An example method includes receiving a user selection of one or more parameters, receiving an identification of a destination for the one or more parameters, determining a number of the one or more parameters, determining a source of the one or more parameters, and based on the destination, the number, and the source, presenting a choice matrix for user selection.

25 Claims, 11 Drawing Sheets

(56) References Cited

U.S. PATENT DOCUMENTS

| | | | |
|---|---|---|---|
| 2009/0055245 A1* | 2/2009 | Bostock | G06Q 30/0203 705/7.32 |
| 2011/0219321 A1* | 9/2011 | Gonzalez Veron et al. | 715/764 |
| 2012/0016720 A1* | 1/2012 | Meyer et al. | 705/7.32 |
| 2014/0095513 A1* | 4/2014 | Kriebel et al. | 707/748 |

* cited by examiner

| | DESTINATION | DESTINATION CONTAINS VOL | DRAGGED ITEMS | ITEMS CONTAIN VOL | VOL JOIN OPTIONS | SOURCE | STANDARD DROP ZONES | NOT DROP ZONES |
|---|---|---|---|---|---|---|---|---|
| 301 | EMPTY BASE/ ROW/COLUMN | - | SINGLE A | NO | - | - | A | NOT A |
| 302 | EMPTY BASE/ ROW/COLUMN | - | MULTIPLE A, B | NO | - | SAME QUESTION | A OR B / A, B | NOT A OR NOT B / A, B |
| 303 | EMPTY BASE/ ROW/COLUMN | - | MULTIPLE A, B | NO | - | DIFFERENT QUESTIONS | A AND B / A, B | NOT A AND NOT B / NOT A, NOT B |
| 304 | EMPTY BASE/ ROW/COLUMN | - | SINGLE A | VOL OR MIXED | - | - | A | NOT A |
| 305 | EMPTY BASE/ ROW/COLUMN | - | MULTIPLE A, B | VOLs | TOTAL | VOLs MUST BE FROM ONE QUESTION | TOTAL (A, B) / TOTAL A, TOTAL B | NOT (TOTAL A, B) / NOT TOTAL A, NOT TOTAL B |
| 306 | EMPTY BASE/ ROW/COLUMN | - | MULTIPLE A, B | VOLs | AVERAGE | VOLs MUST BE FROM ONE QUESTION | AVERAGE (A, B) / AVERAGE A, AVERAGE B | NOT (AVERAGE A, B) / NOT AVERAGE A, NOT AVERAGE B |
| 307 | EMPTY BASE/ ROW/COLUMN | - | MULTIPLE A, B | VOLs | MEDIAN | VOLs MUST BE FROM ONE QUESTION | MEDIAN (A, B) / MEDIAN A, MEDIAN B | NOT (MEDIAN A, B) / NOT MEDIAN A, NOT MEDIAN B |
| 308 | EXISTING BASE/ ROW/COLUMN X | NO | SINGLE A | NO | - | - | X AND A / X OR A | X AND NOT A / X OR NOT A |

| | | | | | | |
|---|---|---|---|---|---|---|
| 309 | EXISTING BASE/ ROW/COLUMN X | NO | BUILT CODE ONLY A | MIXED | - | VOLs MUST BE FROM ONE QUESTION | X AND A | X AND NOT A |
| 310 | EXISTING BASE/ ROW/COLUMN X | NO | SINGLE A | VOL | TOTAL | - | X AND TOTAL A | X AND NOT TOTAL A |
| 311 | EXISTING BASE/ ROW/COLUMN X | NO | SINGLE A | VOL | AVERAGE | - | X AND AVERAGE A | X AND NOT AVERAGE A |
| 312 | EXISTING BASE/ ROW/COLUMN X | NO | SINGLE A | VOL | MEDIAN | - | X AND MEDIAN A | X AND NOT MEDIAN A |
| 313 | EXISTING BASE/ ROW/COLUMN X | NO | MULTIPLE A, B | NO | - | SAME QUESTION | X AND (A OR B) X AND A, X AND B | X AND NOT (A OR B) X AND NOT A, X AND NOT B |
| 314 | EXISTING BASE/ ROW/COLUMN X | NO | MULTIPLE A, B | NO | - | DIFFERENT QUESTIONS | X AND A AND B X AND A, X AND B | X AND NOT (A AND B) X AND NOT A, X AND NOT B |
| 315 | EXISTING BASE/ ROW/COLUMN X | NO | MULTIPLE A, B | VOLs | TOTAL | VOLs MUST BE FROM ONE QUESTION | X AND TOTAL (A, B) X AND TOTAL A, X AND TOTAL B | X AND NOT (TOTAL A, B) X AND NOT TOTAL A, X AND NOT TOTAL B |
| 316 | EXISTING BASE/ ROW/COLUMN X | NO | MULTIPLE A, B | VOLs | AVERAGE | VOLs MUST BE FROM ONE QUESTION | X AND AVERAGE (A, B) X AND AVERAGE A, X AND AVERAGE B | X AND NOT (AVERAGE A, B) X AND NOT AVERAGE A, X AND NOT AVERAGE B |
| 317 | EXISTING BASE/ ROW/COLUMN X | NO | MULTIPLE A, B | VOLs | MEDIAN | VOLs MUST BE FROM ONE QUESTION | X AND MEDIAN (A, B) X AND MEDIAN A, X AND MEDIAN B | X AND NOT (MEDIAN A, B) X AND NOT MEDIAN A, X AND NOT MEDIAN B |

METHODS AND APPARATUS TO PROVIDE A CHOICE SELECTION WITH DATA PRESENTATION

FIELD OF THE DISCLOSURE

The present disclosure pertains to information systems and, more particularly to methods and apparatus to provide a choice selection with data presentation.

BACKGROUND

Collections of data are only useful when a system for viewing or analyzing the data is available. For example, the results of surveys can generate complex data relationships. In order to analyze the relationships and to gather meaningful data from the survey results, the data are often displayed in a grid having two axes. Each axis includes desired parameters. At the intersection of each parameter from first axis and each parameter from the second axis, a value is displayed that indicates the number of people that fit in the category defined by the parameter of the first axis and the parameter of the second axis. For example, the parameter of the first axis may be all respondents that are male and the parameter of the second axis may be all respondents that indicated that they liked peanuts.

The identifications of which parameters should be displayed along each axis are typically accomplished by inputting parameter identifiers (e.g., codes). For example, to request that the Male parameter be added, a user would determine the identifier for Male (e.g., 139X) and input the parameter identifier. If a user wanted to develop a complex query, they would need to keep track of all of the parameter identifiers and the parsing order. For example, a parameter combination using 8 parameters could be: 139X!1222!1512!(214!512!(211!221!421)). Due to the complexity of entering and understanding parameter combinations, developing complex information displays is difficult and time consuming.

BRIEF DESCRIPTION OF THE DRAWINGS

FIGS. 4-20 illustrate example user interfaces implemented according to the disclosed methods and apparatus.

DETAILED DESCRIPTION

Figure 1:
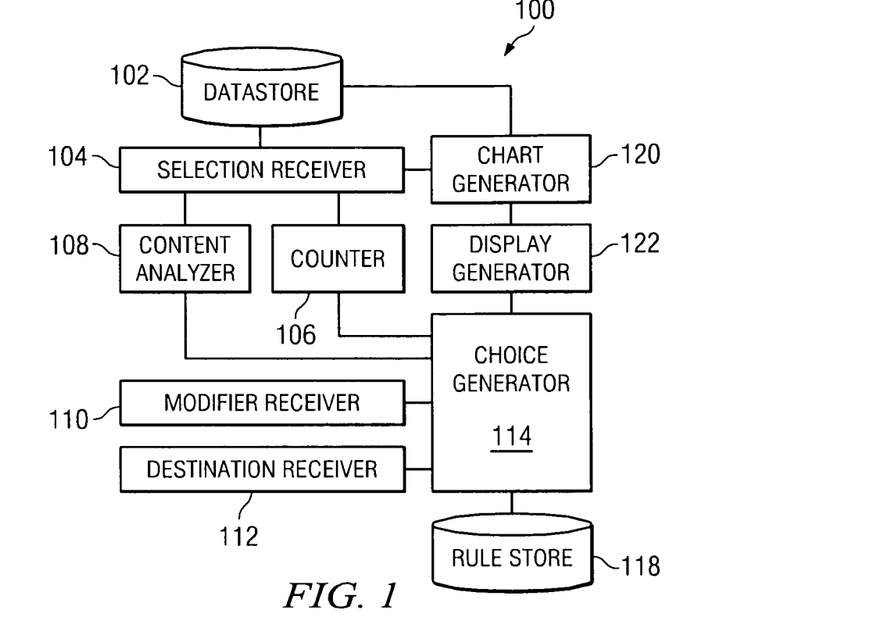
FIG. 1 is a block diagram of an example implementation of a system to provide a choice selection to a user.

FIG. 1 is a block diagram of an example implementation of a system 100 to provide a choice selection to a user. For example, the system 100 may be configured to allow a user to control a display and analysis of data from one or more surveys. For example, a user may select one or more parameters (answers to survey questions) and specify a destination in the display where the parameters should be displayed (e.g., the user may drag one or more parameters to a desired destination). Based on the parameters selected and the destination requested, the system 100 determines one or more choices for how the parameters should be displayed. The user is presented with the choices (e.g., a choice to add the parameters to the display as unique columns or a single column with all of the selected parameters grouped). Once the user selects one of the choices, the parameters are added to the display based on the selected choice.

The example system 100 of FIG. 1 includes a datastore 102, a selection receiver 104, a counter 106, a content analyzer 108, a modifier receiver 110, a destination receiver 112, a choice generator 114, a rule store 118, a chart generator 120, and a display generator 122.

The datastore 102 of the illustrated example stores the results (e.g., answers) of survey questionnaires. The results are stored such that the results can be retrieved based on one or more desired answers. For example, a query can retrieve the number of people that indicated that they were male, between ages 18 and 24, like a particular sports drink, and regularly watch a particular sporting event. In the illustrated example, the results are also grouped by questions. For example, all possible answers to the question "What is your favorite sports drink?" are grouped with that question. Therefore, the example system 100 can determine whether answers selected by a user are associated with the same question or different questions. While an example implementation of the datastore 102 has been described, the datastore 102 may be any type of data storage and may store any type of data. For example, the datastore 102 may be a database, a file system, a memory, etc.

The selection receiver 104 of the illustrated example receives user selection(s) of available parameters. In particular, the example selection receiver 104 receives user selection(s) by identifying when a user selects one or more parameters from the datastore using a computer pointing device (e.g., a mouse, a touchpad, a touchscreen, etc). The selection receiver 104 of the illustrated example additionally receives a user's selection of choices prepared by the choice generator 114 and displayed by the display generator 122. The selection receiver 104 may receive selections and/or choices in any manner. In addition, the selection receiver 104 may be implemented by a first component to receive a user's selection of parameters and a second component to receive a user's selection of a choice.

The example counter 106 receives the user selection(s) from the selection receiver 104 and determines the number of selected parameters. The counter 106 may determine the exact number of selected parameters or may determine whether one or more than one parameters have been selected.

The content analyzer 108 of the illustrated example receives the user selection(s) from the selection receiver 104 and analyzes the content of the selection(s). The example content analyzer 108 determines if all parameters have been selected from the same group (e.g., multiple answers from the same question) or if parameters have been selected from different groups (e.g., answers from multiple questions). Additionally or alternatively, the content analyzer 108 may analyze data associated with the selection, may analyze the type of parameter(s) selected (e.g., an answer that has a yes/no answer, an answer that has a numerical or volumetric answer, etc.).

The modifier receiver 110 of the illustrated example receives requests from users to modify the choice generator. The example modifier receiver 110 may receive a request for the choice generator 114 to use an alternate set of rules stored in the rule store 118. For example, the modifier receiver 110 may recognize that a user has held the shift key while dragging a selection of parameters indicating that the user desires that the opposite of the parameter be added (e.g., rather than adding a parameter to a column formula using an "AND" operator, the parameter should be added using a "NOT" operator). Any type of input may be associated with a modification such as, for example, a user pressing any key on a keyboard, a user dragging a selection using a particular gesture, etc.

The destination receiver 112 receives an identification of a destination for selected parameters. According to the illustrated example, the destination is identified by a user dragging a selection of parameters to a desired destination and "dropping" the selection(s) on the destination. For example, the destination may be a particular part of a grid (e.g., a column header, a row header, etc.) or a hotspot (e.g., a hotspot for adding a new column, a new row, or a new base parameter applied to all rows and columns). Alternatively, the destination may be provided by a user selecting a drop down, a user selecting parameters and then clicking a destination with a pointing device, etc.).

Figures 3, 3A:
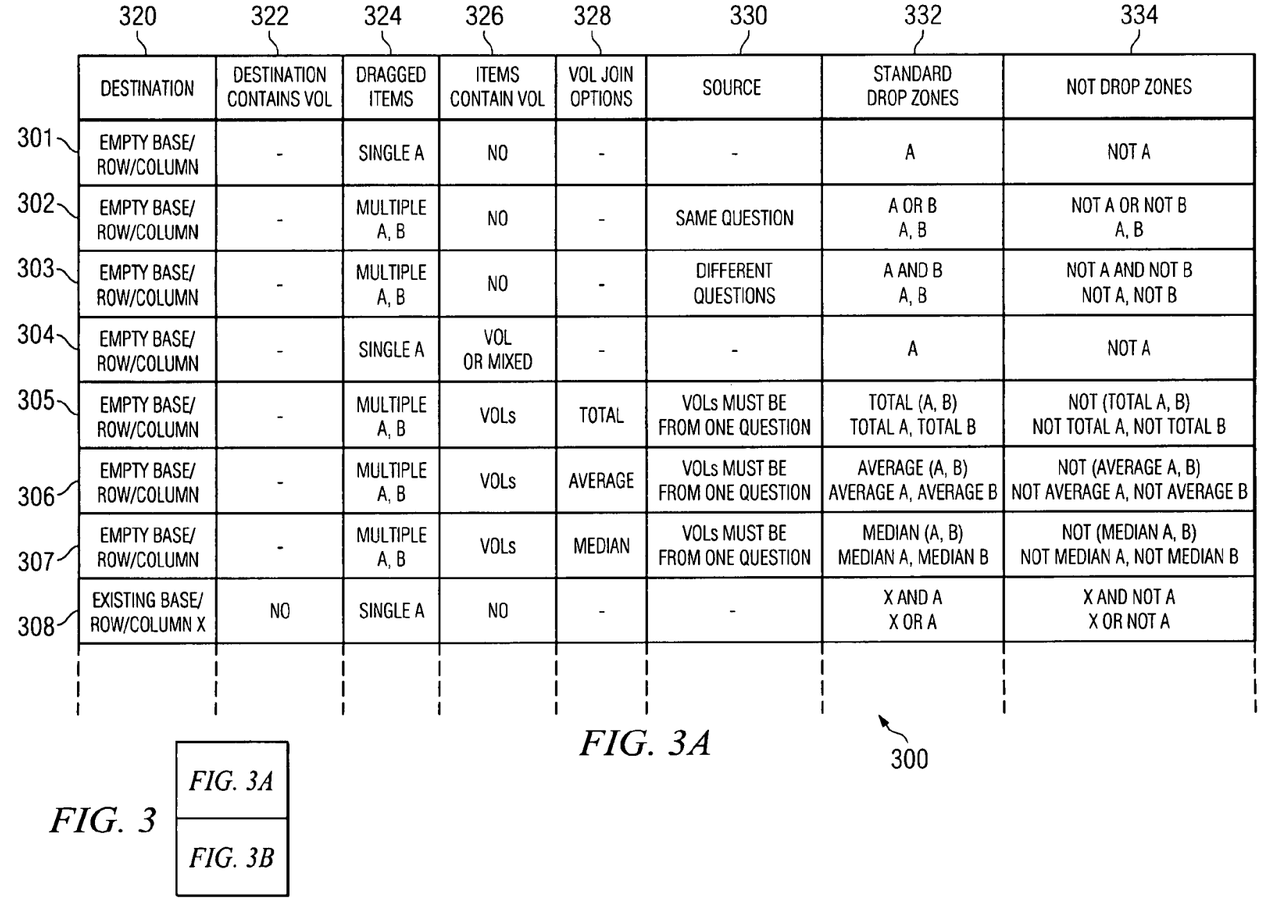
FIG. 3 is a table illustrating example rules and associated choices that may implement the rule store of FIG. 1.
Figure 3B:
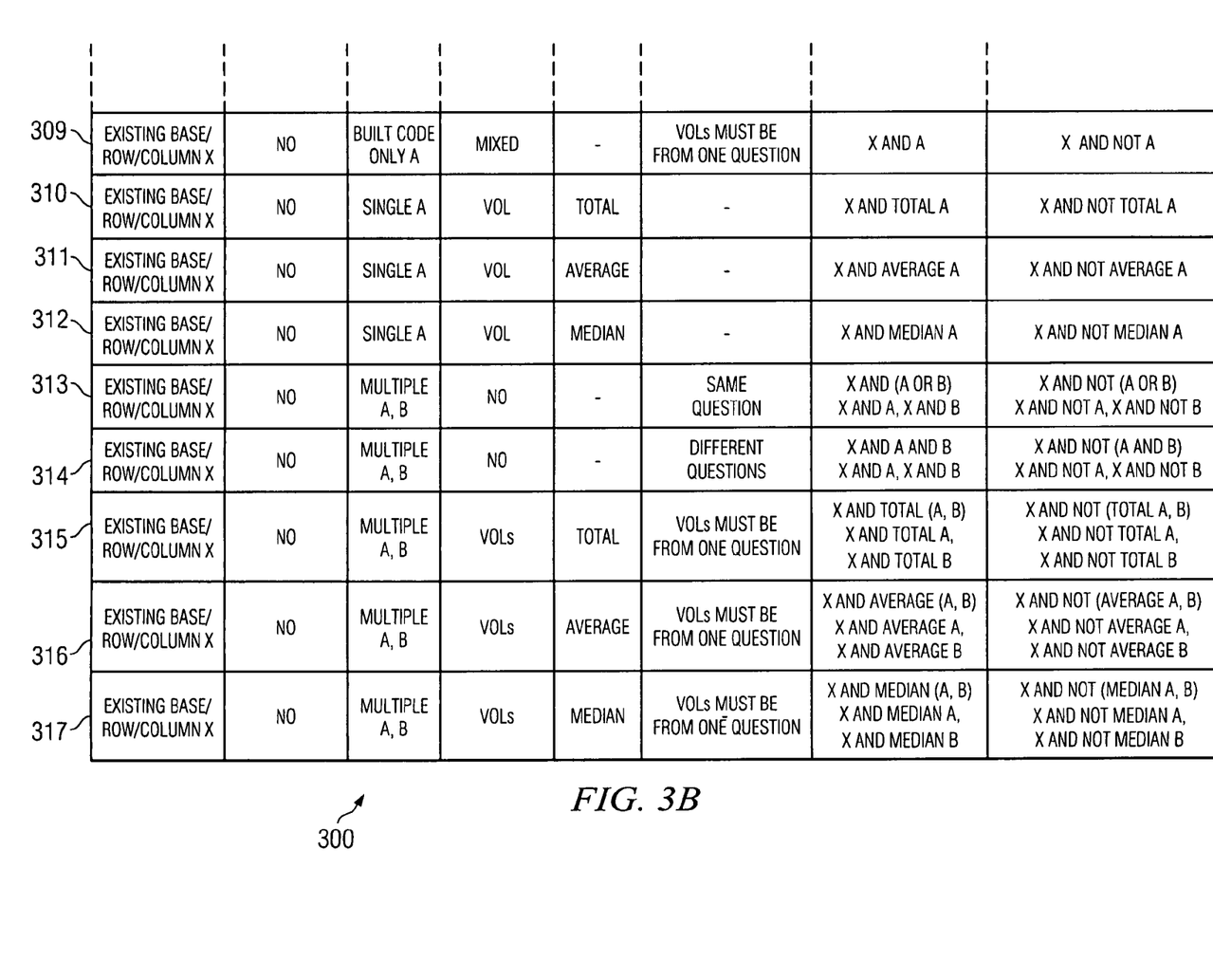

The choice generator 114 of the illustrated example receives the count of the number of selected parameters from the counter 106, the analysis of the content from the content analyzer 108, an indication of a modification request from the modifier receiver 110, and the destination from the destination receiver 112. Based on the inputs, the choice generator 114 retrieves one or more appropriate rules from the rule store 118 and generates a choice matrix (i.e., one or more choices that a user may select). An example table of rules 300 is illustrated in FIG. 3 and described in further detail below. Based on the one or more rules, the choice generator 114 determines one or more choices that should be presented to users. The choices provide options for how the selected data should be added to the destination. The choice generator transmits the one or more choices to the display generator 122.

The example rule store 118 is a set of rules that indicate which choice or choices should be presented to a user based on the number, content, destination, and any modifiers requested for selected parameters. The rule store 118 of the illustrated example is integrated in instructions for the choice generator 114. Alternatively, the rule store 118 may be implemented by any type of database, any type of file system, any type of memory, and/or any other type of storage for rules or instructions.

The example chart generator 120 generates a chart to display parameter information to users. According to the illustrated example, the chart generator 120 allows a user to specify (e.g., via the selection receiver 104) row identifiers as one or more parameters queries and column identifiers as one or more parameters queries. The intersection of each row and column displays data indicating the number of people that answered according to the parameters identifying the row and the parameters identifying the column. The chart generator 120 retrieves the appropriate data from the datastore 102 and transmits the chart information to the display generator 122. While the example system 100 is described with respect to a chart display, any type of display may be provided. For example, a graphical display may be provided, a three-dimensional perspective display may be provided, a word processing display may be provided, etc.

The example display generator 122 receives the choices from the choice generator 114 and generates a display of the choices. According to the illustrated example, after a user drags a selection of parameters and drops the selection on a destination, choices are displayed as hotspots around the representation of the user's pointing device on a display. For example, a first choice may be displayed above the representation and a second choice may be displayed below the representation. The user may then choose one of the choices by moving the representation of the pointing device onto one of the choices. Alternatively, any other manner of providing the choices may be used. For example, a drop down list may be displayed, hot keys on a keyboard may be used to select a choice, a voice-activated interface may be provided, a scroll-wheel may be used, etc.

While an example manner of implementing the system 100 has been illustrated in FIG. 1, one or more of the elements, processes and/or devices illustrated in FIG. 1 may be combined, divided, re-arranged, omitted, eliminated and/or implemented in any other way. Further, the example datastore 102, selection receiver 104, counter 106, content analyzer 108, modifier receiver 110, destination receiver 112, choice generator 114, rule store 118, chart generator 120, and/or display generator 122 and/or, more generally, the example system 100 may be implemented by hardware, software, firmware and/or any combination of hardware, software and/or firmware. Thus, for example, any of the example datastore 102, selection receiver 104, counter 106, content analyzer 108, modifier receiver 110, destination receiver 112, choice generator 114, rule store 118, chart generator 120, and/or display generator 122 and/or, more generally, the example system 100 could be implemented by one or more circuit(s), programmable processor(s), application specific integrated circuit(s) (ASIC(s)), programmable logic device(s) (PLD(s)) and/or field programmable logic device(s) (FPLD(s)), etc.

When any of the appended claims are read to cover a purely software and/or firmware implementation, at least one of the example datastore 102, selection receiver 104, counter 106, content analyzer 108, modifier receiver 110, destination receiver 112, choice generator 114, rule store 118, chart generator 120, and/or display generator 122 are hereby expressly defined to include a tangible medium such as a memory, DVD, CD, etc. storing the software and/or firmware. Further still, the example system 100 may include one or more elements, processes and/or devices in addition to, or instead of, those illustrated in FIG. 1, and/or may include more than one of any or all of the illustrated elements, processes and devices.

Figure 2:
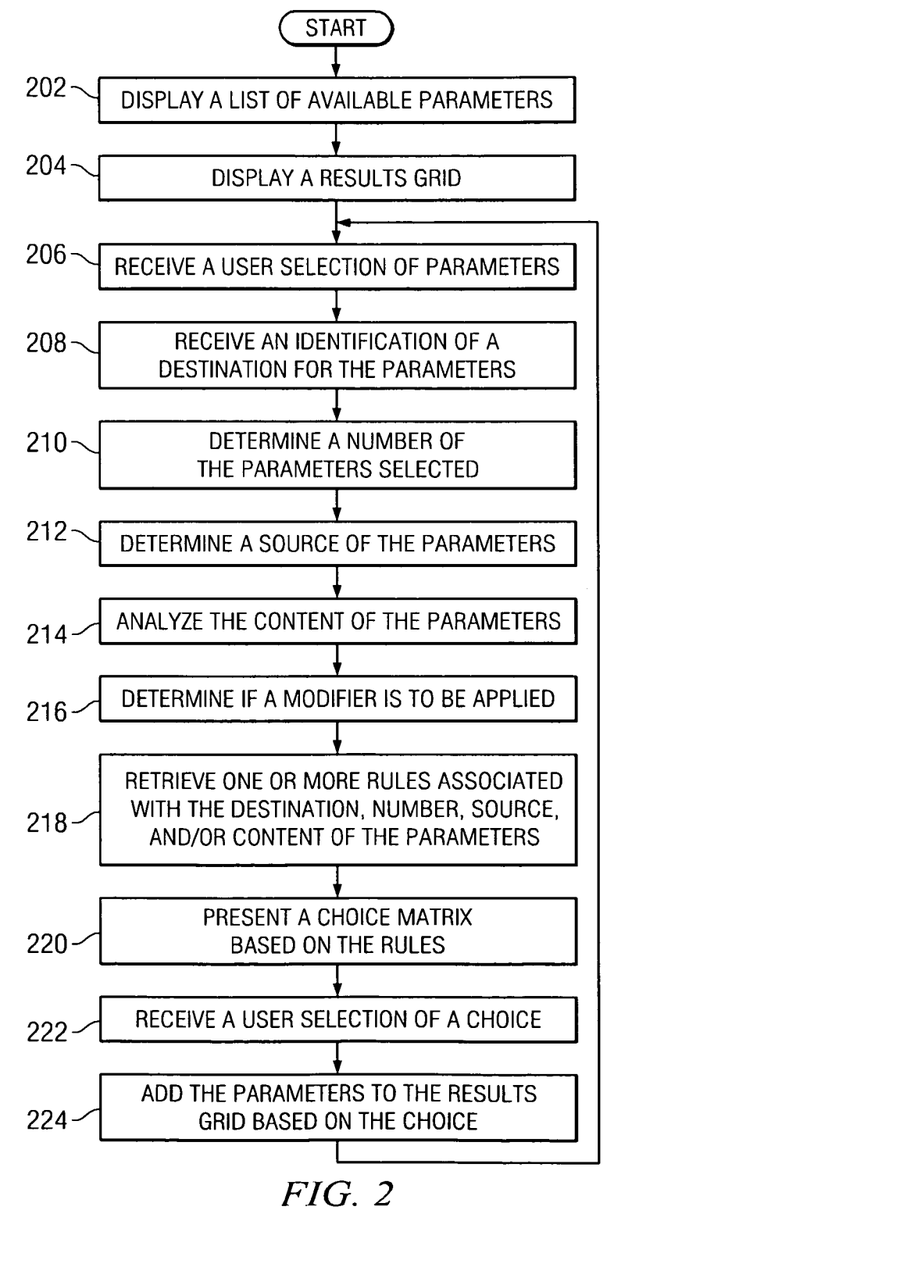
FIG. 2 is a flowchart representative of example machine readable instructions that may be executed to implement the system of FIG. 1.

FIG. 2 is a flowchart representative of example machine readable instructions that may be executed to implement the example datastore 102, selection receiver 104, counter 106, content analyzer 108, modifier receiver 110, destination receiver 112, choice generator 114, rule store 118, chart generator 120, and/or display generator 122. The example machine readable instructions of FIG. 2 may be executed by a processor, a controller, and/or any other suitable processing device. For example, the example machine readable instructions of FIG. 2 may be embodied in coded instructions stored on a tangible medium such as a flash memory, or random access memory (RAM) associated with a processor (e.g., the processor 2112 shown in the example processor platform 2100 and discussed below in conjunction with FIG. 21). Alternatively, the example flowchart of FIG. 2 may be implemented using an application specific integrated circuit (ASIC), a programmable logic device (PLD), a field programmable logic device (FPLD), discrete logic, hardware, firmware, etc. In addition, the example flowchart of FIG. 2 may be implemented manually or as combinations of any of the foregoing techniques. For example, any or all of the example datastore 102, selection receiver 104, counter 106, content analyzer 108, modifier receiver 110, destination receiver 112, choice generator 114, rule store 118, chart generator 120, and/or display generator 122 may be implemented by a combination of firmware, software, and/or hardware. Further, although the example datastore 102, selection receiver 104, counter 106, content analyzer 108, modifier receiver 110, destination receiver 112, choice generator 114, rule store 118, chart generator 120, and/or display generator 122 are implemented by executing the example machine readable instructions represented by the flowcharts of FIG. 2, persons of ordinary skill in the art will readily appreciate that many other methods of implementing instructions represented by FIG. 2 may be employed. For example, the order of execution of the blocks may be changed, and/or some of the blocks described may be changed, eliminated, sub-divided, and/or combined. Additionally, persons of ordinary skill in the art will appreciate that the example machine readable instructions of FIG. 2 may be carried out sequentially and/or carried out in parallel by, for example, separate processing threads, processors, devices, circuits, etc.

FIG. 2 is a flowchart of example machine readable instructions that may be executed to display and receive a user choice selection. The flowchart of FIG. 2 begins when the chart generator 120 and the display generator 122 display a list of available parameters (e.g., the codebook 402 of FIG. 4) (block 202). The chart generator 120 and the display generator 122 also display a results grid (e.g., the results grid 404 of FIG. 4) (block 204). The selection receiver 104 then receives a user selection of one or more parameters from the codebook 402 (block 206). According to the illustrated example, the user selects one or more parameters and drags the parameters to a destination. The destination receiver 112 receives an identification of the destination for the one or more parameters (block 208).

Next, based on the received selection, the counter 106 determines the number of parameters selected by the user (block 210). The content analyzer 108 then determines a source of the one or more parameters (block 212). For example, the content analyzer 108 may determine a datastore from which the parameters were selected, may determine whether the parameters were selected from the same group, etc. The content analyzer 108 also analyzes the content of the one or more parameters (block 214). For example, the content analyzer 108 may determine whether any of the selected parameters are volumetric parameters. Then, the modifier receiver 110 determines if a modifier is to be applied (block 216).

After collecting information about the received parameter selection, the choice generator 114 retrieves one or more rules associated with the collected information (block 218). Based on the rules, the choice generator 114 and the display generator 122 present a choice matrix based on the one or more rules (block 220). The user then makes a selection that is received by the selection receiver 104 (block 222). The parameter information is then added to or updated on the result grid by the chart generator 120 and the display generator 122 (block 224). Control then returns to block 206 to await a further selection by a user.

The example table 300 of FIG. 3 illustrates example rules 301-317 and associated choices 332 and 334 that may implement the rule store 118 of FIG. 1. The example table 300 includes a column of destinations 320, a column indicating whether the destination contains a volumetric parameter 322, a column for the number of selected parameters 324, a column indicating whether the selected parameters include a volumetric parameter 326, a column indicating whether the includes a volumetric join operation 328, a column indicating information about the source of selected parameters 330, a column indicating the choices that should be presented column 332, and a column indicating choices that should be presented if a modifier is requested column 334.

Rule 301 is applied when the destination is an empty (e.g., not currently populated) base (i.e., base rule for the entire results grid), row, or column; a single parameter is selected; and the parameter is not a volumetric parameter. When a scenario matching rule 301 is determined by the choice generator 114, the choice generator 114 and the display generator 122 present a single choice showing the selected parameter. If a modifier is requested, the choice generator 114 and the display generator 122 present the inverse of the selected parameter (e.g., NOT A, where A is the parameter). Rule 302 is applied when the destination is empty, multiple parameters are selected from the same question, and none of the parameters are volumetrics. Column 332 shows that for rule 302, a user is presented with the choice of adding a parameter that is a union of each parameter (e.g., A OR B OR C . . . ) or adding each parameter as a unique field (e.g., A,B,C . . . as separate columns, rows, bases, etc.). Rule 308 is applied when an existing field X is selected and a single parameter that is not a volumetric is selected. Column 332 shows that for rule 308, a user is presented with the choice for making the field X an intersection of X and the selected parameter (e.g., X AND A) or a choice for making the field X a union of X and the selected parameter (e.g., X OR A).

FIG. 4 is an illustration of an example user interface 400 implemented according to the disclosed methods and apparatus. The example user interface includes a codebook 402 for displaying available parameters and results grid 404 for displaying results according to user selection. An example group is represented by label 406. The group sports (e.g., the list of answers to a question of what sports a person completing a survey enjoys watching, playing, etc.) includes football/soccer, American football, basketball, cricket, ice hockey, hockey, rugby, rugby union, and volleyball. A user can select one or more parameters from the codebook 402 and drag the parameters into the results grid 404.

The results grid 404 includes a hotspot area 408 in which hotspots for adding columns, rows, and base grid parameters will be displayed when a user selects one or more parameters and begins to drag them. The results grid 404 also includes column headers 410 and row headers 412. As can be seen from the figure, statistical results for the corresponding column and row are displayed at the intersection of each column and row. The example results grid 404 displays the number of people that answered with both the answer from the row and the column (Unwgt), the number of people in the entire population represented by the sample number of people in the Unwgt column (000s), the percent of the entire column parameter represented by the row (Vert %), the percent of the entire row parameter represented by the column (Horz %), and how likely a person is to answer according to the combination of row and column compared to the entire population (Index) (e.g., a value of 130% means that the population represented by the row and/or column is 30% more likely to answer the combination or row and column than the rest of the population.

Figure 5:
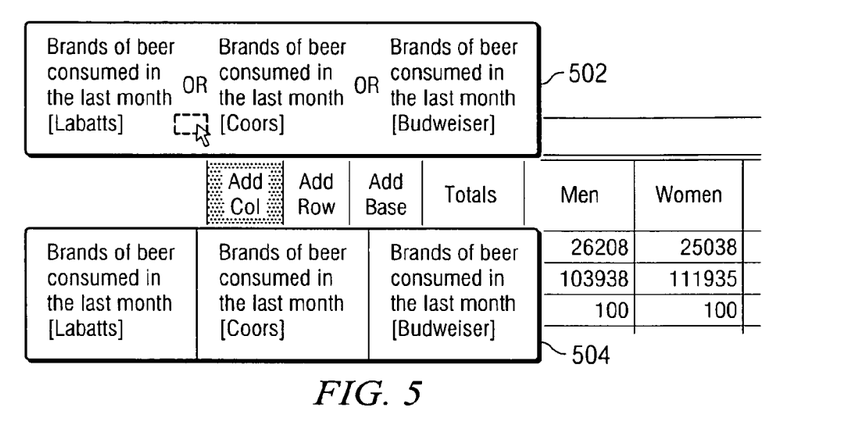

FIG. 5 is an illustration of an example user interface that may be displayed after a user drags a selection from the codebook 402 onto the hotspot area 408 of the results grid 404 of FIG. 4. As shown in the illustration, the user has selected three brands of beer: Labatts, Coors, and Budweiser. Because the parameter selection is from a single question and has been dropped on an empty field (e.g., the hotspot), the rule 302 of FIG. 3 is applied. The user is presented with a first option 502 to create a single column that is the union of the three beers and a second option 504 to create three columns (i.e., one for each beer).

Figure 6:
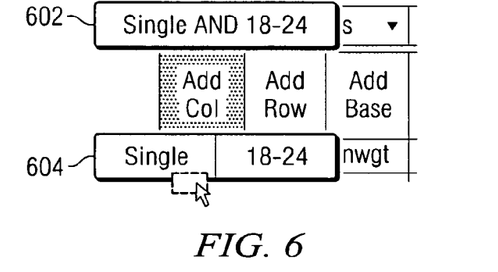

FIG. 6 is an illustration of another example user interface that may be displayed after a user drags a selection from the codebook 402 onto the hotspot area 408 of the results grid 404 of FIG. 4. As shown in the illustration, the user has selected the relationship status Single and the age group 18-24. Because Single and 18-24 are from different questions (e.g., "What is your relationship status?" and "What is your age?") and an empty field has been selected, rule 303 is applied. Accordingly, the user is presented with a first choice 602 to add a new column for the intersection of Single and 18-24 and a second choice 604 to add two separate columns.

Figure 7:
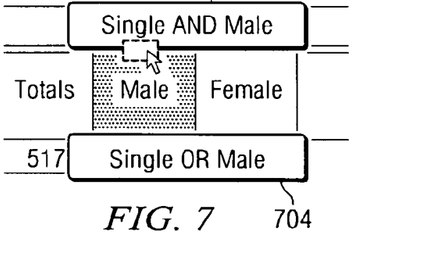

FIG. 7 is an illustration of an example user interface that may be displayed after a user drags a selection from the codebook 402 onto the hotspot area 408 of the results grid 404 of FIG. 4. As shown in the illustration, the user has selected the relationship status Single. Because a single parameter has been selected and an existing field has been selected (Male), rule 308 is applied. Accordingly, the user is presented with a first choice 702 to change the Male column to the intersection of Single and Male and a second choice 704 to change the Male column to the union of Single and Male.

Figure 8:
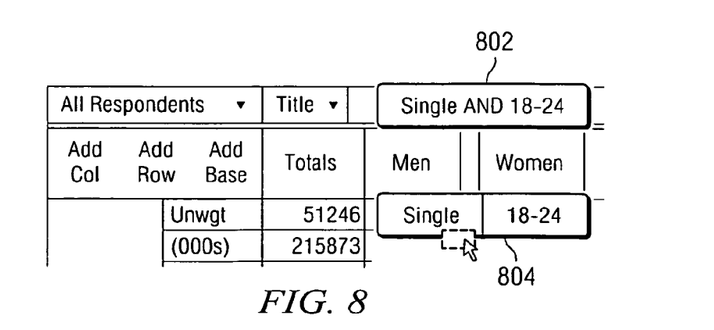

FIG. 8 is an illustration of an example user interface that may be displayed after a user drags a selection from the codebook 402 onto the hotspot area 408 of the results grid 404 of FIG. 4. As shown in the illustration, the user has selected the relationship status Single and the sex Male. Because Single and Male are from different questions (e.g., "What is your relationship status?" and "What is your sex?") and an empty field has been selected, rule 303 is applied. Accordingly, the user is presented with a first choice 802 to add a new column for the intersection of Single and Male and a second choice 804 to add two separate columns.

Figure 9:
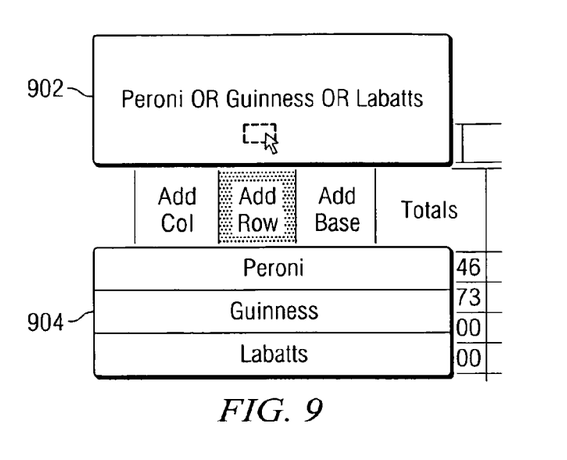

FIG. 9 is an illustration of an example user interface that may be displayed after a user drags a selection from the codebook 402 onto the hotspot area 408 of the results grid 404 of FIG. 4. As shown in the illustration, the user has selected the three beers: Peroni, Guinness, and Labatts. Because Peroni, Guinness, and Labatts are from the same question and an empty field (i.e., the add row hotspot) has been selected, rule 302 is applied. Accordingly, the user is presented with a first choice 902 to add a new row for the union of the three beers and a second choice 904 to add three separate rows.

Figure 10:
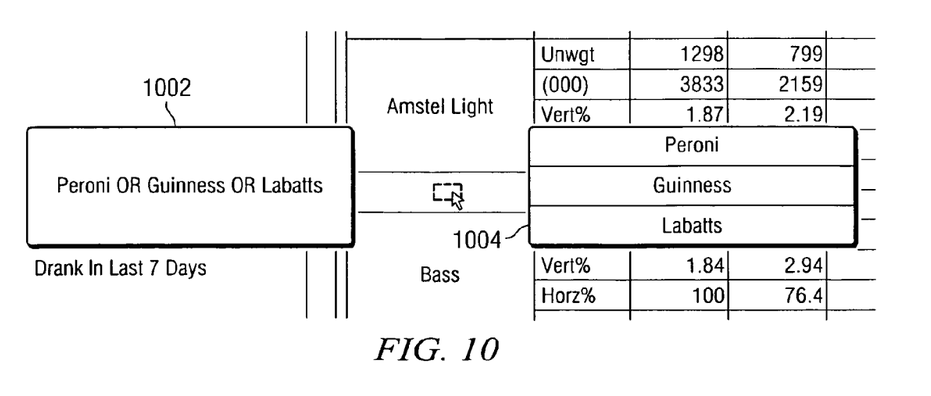

FIG. 10 is an illustration of an example user interface that may be displayed after a user drags a selection from the codebook 402 onto the hotspot area 408 of the results grid 404 of FIG. 4. As shown in the illustration, the user has selected the three beers: Peroni, Guinness, and Labatts. Because Peroni, Guinness, and Labatts are from the same question and an empty field (i.e., the add row hotspot) has been selected, rule 302 is applied. Accordingly, the user is presented with a first choice 1002 to add a new row for the union of the three beers and a second choice 1004 to add three separate rows.

Figure 11:
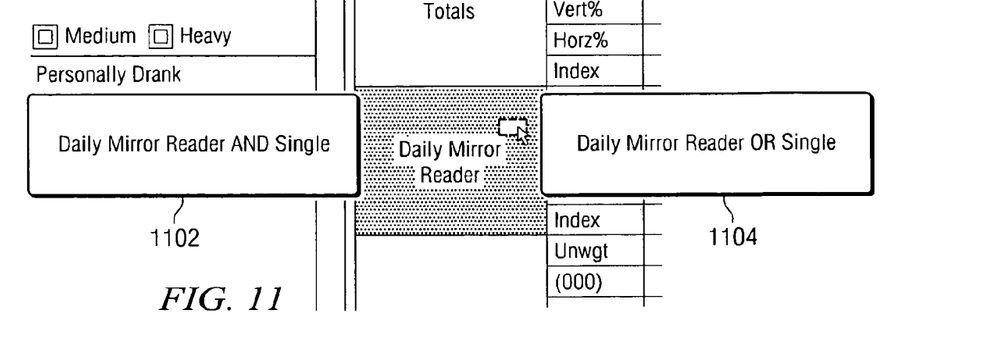

FIG. 11 is an illustration of an example user interface that may be displayed after a user drags a selection from the codebook 402 onto the hotspot area 408 of the results grid 404 of FIG. 4. As shown in the illustration, the user has selected the relationship status Single. Because an existing field (Daily Mirror Reader) has been selected, rule 308 is applied. Accordingly, the user is presented with a first choice 1102 to change the Daily Mirror Reader field to the intersection of Daily Mirror Reader and Single and a second choice 1104 to change the Daily Mirror Reader field to the union of Daily Mirror Reader and Single.

Figure 12:
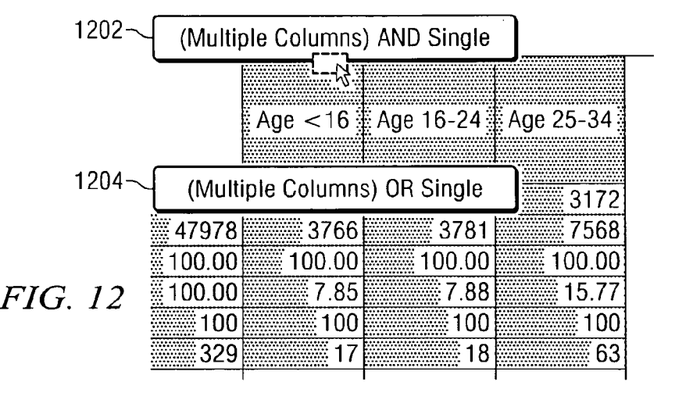

FIG. 12 is an illustration of an example user interface that may be displayed after a user drags a selection from the codebook 402 onto the hotspot area 408 of the results grid 404 of FIG. 4. As shown in the illustration, the user has selected the relationship status Single. The user has selected to apply the selection to the existing columns Age<16, Age 16-24, and Age 25-34. Accordingly, rule 308 is applied. The user is presented with a first choice 1202 to change each existing column to be the intersection of the existing column and the relationship status Single (e.g., Age<16 AND Single, Age 16-24 AND Single, Age 25-34 AND Single) and a second choice 1204 to change each existing column to be the union of the existing column and the relationship status Single (e.g., Age<16 OR Single, Age 16-24 OR Single, Age 25-34 OR Single).

Figure 13:
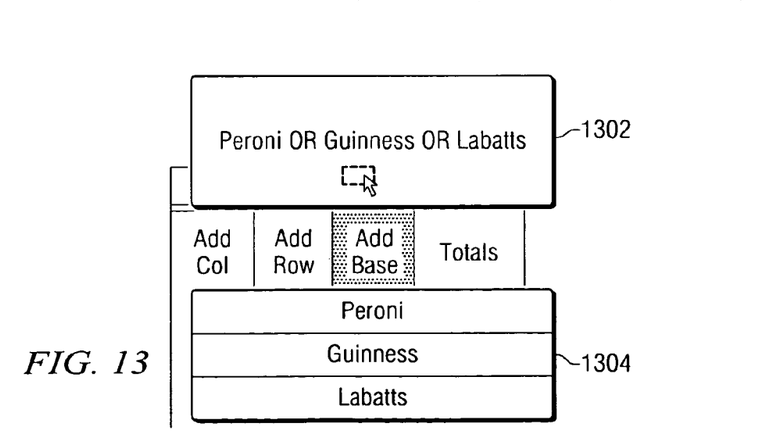

FIG. 13 is an illustration of an example user interface that may be displayed after a user drags a selection from the codebook 402 onto the hotspot area 408 of the results grid 404 of FIG. 4. As shown in the illustration, the user has selected three beers and selected adding a base parameter as the destination. The base parameter limits all data shown in the results grid 404 (e.g., the base parameter is added to all queries). A user may select any added base parameter (e.g., using a drop down menu that lists all selected base parameters). Because the three beers are from the same question an empty field has been selected, rule 303 is applied. Accordingly, the user is presented with a first choice 1302 to add a new base for the union of the three beers and a second choice 1304 to add three separate base options.

Figure 14:
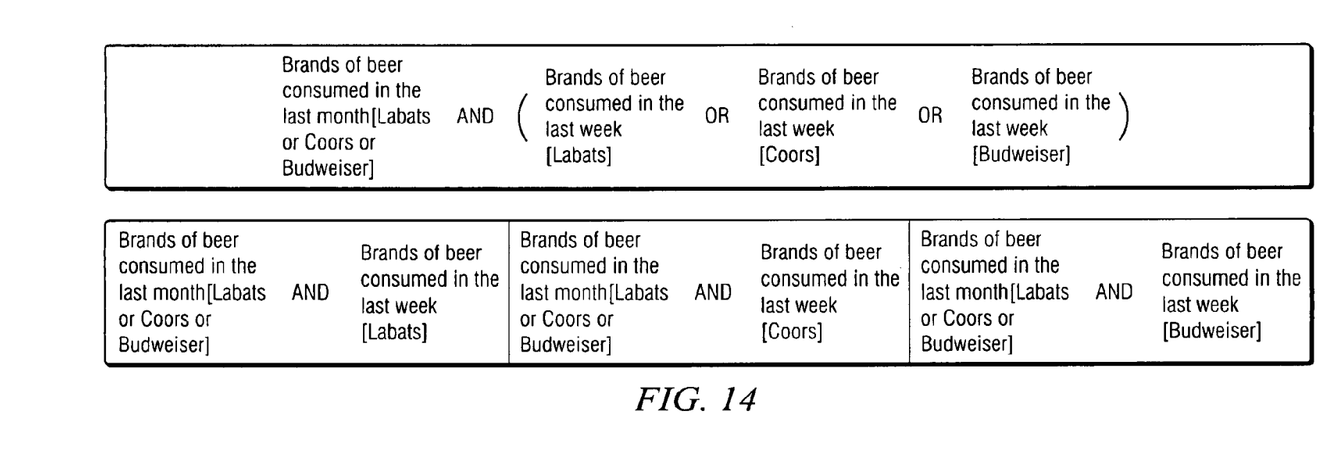

FIG. 14 is an illustration of an example user interface that may be displayed after a user drags a selection from the codebook 402 onto the hotspot area 408 of the results grid 404 of FIG. 4. As shown in the illustration, the user has selected three beers for the question "Brands of beer consumed in the last week") and selected to add to a field having the intersection of Labatts, Coors, and Budweiser for "Beers consumed in the last month." Because the selection is for an existing field and the question for the selection is the same for the entire selection, rule 313 is applied. Accordingly, the user is presented with a first choice 1402 to add an intersection of the existing field and the union of the three beers and a second choice 1404 to add three separate fields that are the intersection of each of the three beers with the existing field.

Figure 15:
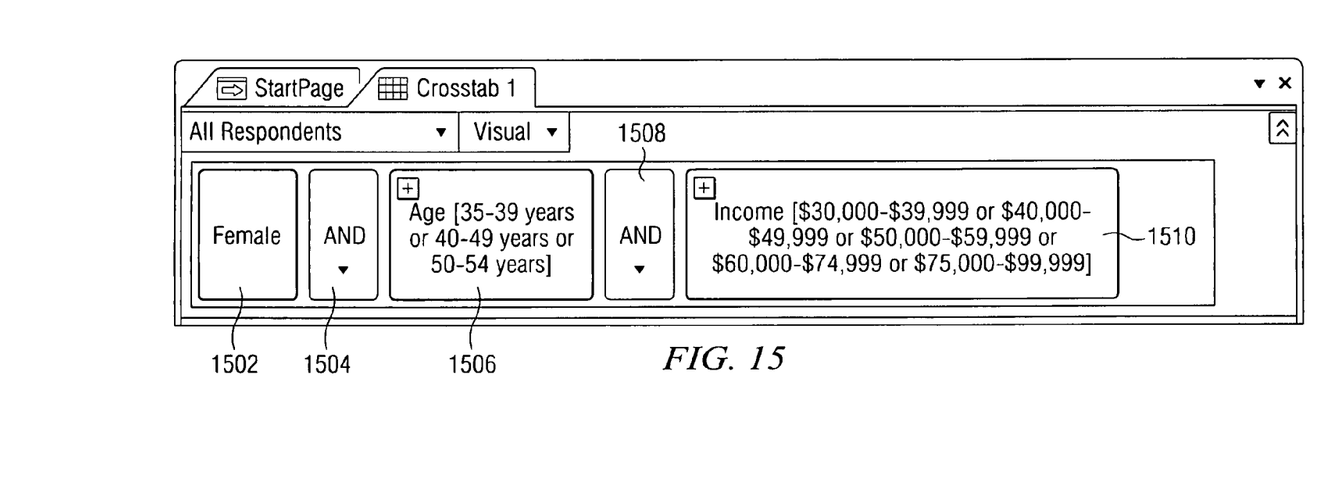
Figure 16:
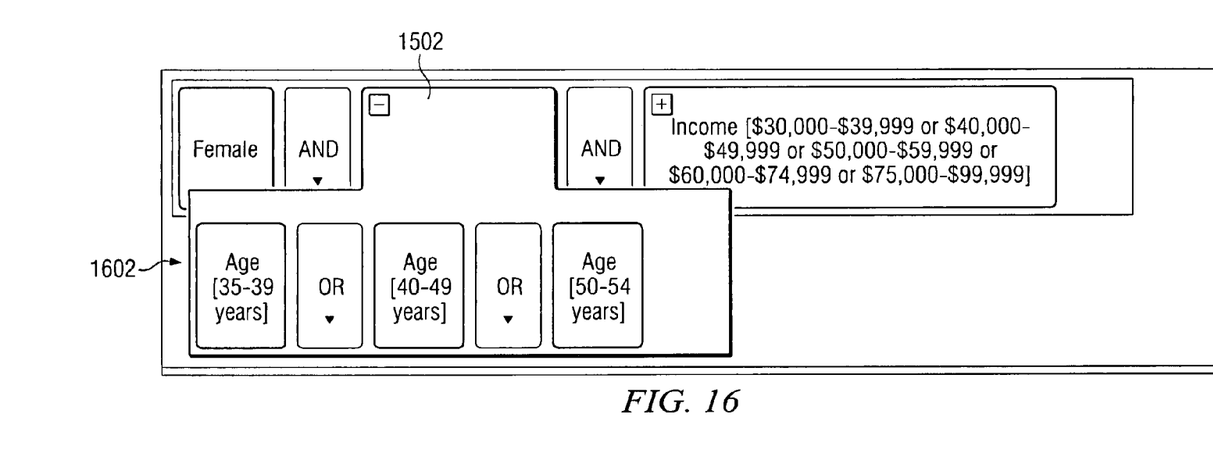

FIG. 15 is an illustration of an example user interface that may be displayed to enable a user to edit an entered parameter field. While hierarchical listboxes have been used to allow editing of parameter combinations, such hierarchical listboxes are not flexible and use a large amount of screen space to display even basic queries. In the example of FIG. 15 a user has selected to edit the parameter combination "Female AND (Age 35-39 OR 40-49 OR 50-54) AND (Income $30,000-39,999 OR $40,000-49,999 OR $50,000-59,999 OR $60,000-74,999 OR $75,000-99,999)." The example user interface shows that the first level of the parameter combination is parsed into separate blocks (1502-1510). The blocks having parameter combinations (1506 and 1508) include a plus sign that can be used to expand the parameter combination as shown in FIG. 16. The blocks corresponding to grouping operators (1504 and 1508) include an arrow allowing a user to select a different operator (e.g., AND, OR, XOR, NOT, COUNT, etc.)

FIG. 16 is an illustration of an example user interface in which block 1506 of FIG. 15 has been expanded. As shown in the illustrated example, a user may now make changes to the parameter combination of block 1502 using the controls 1602.

Figure 17:
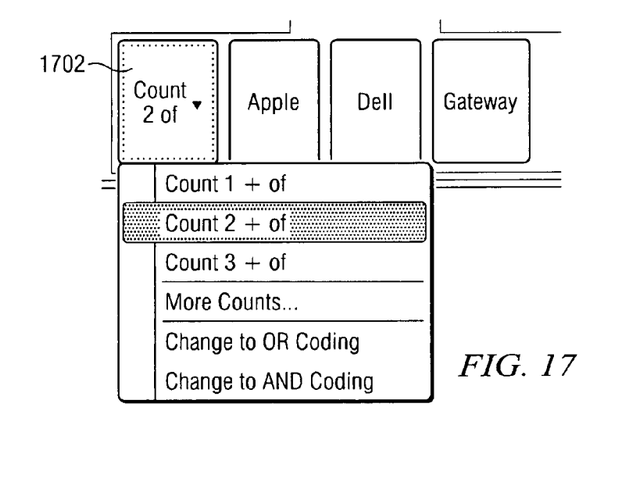

FIG. 17 is an illustration of an example user interface in which a COUNT operator 1702 has been selected. The COUNT 1702 operator allows a user to specify that more than one of a group of parameters should be selected. For example, a user may select that a respondent to a survey must have specified that they own at least two of the types of computers to be included in the results.

Figure 18:
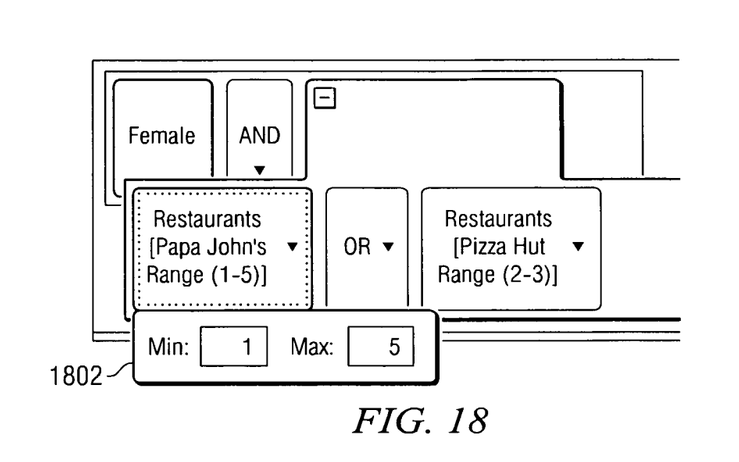

FIG. 18 is an illustration of an example user interface in which a volumetric parameter has been included. The user interface includes a volumetric block 1802 in which a user can select what numerical values should be included in the results. For example, in the illustrated example, users that rated Papa John's restaurants between a score of 1 and a score of 5 are included by block 1802.

Figure 19:
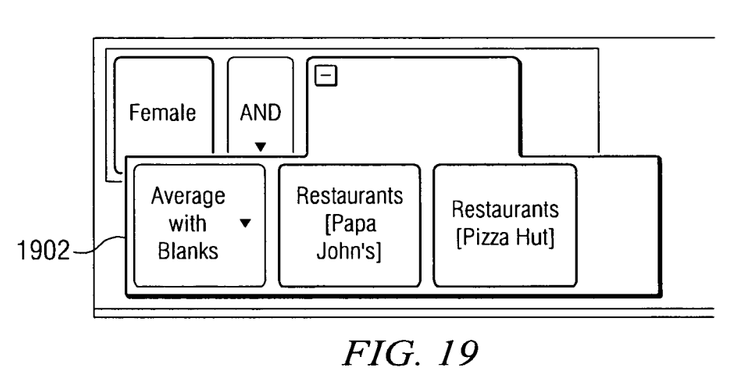

FIG. 19 is an illustration of an example user interface in which a volumetric join block 1902 is included in the user interface for editing parameter combinations. The volumetric join block 1902 of the illustrated example indicates that the average of the Papa John's answer and the Pizza Hut answer should be displayed. Alternatively, the user may select to show a Total for two or more parameters, a Median for two or more parameters, etc.

Figure 20:
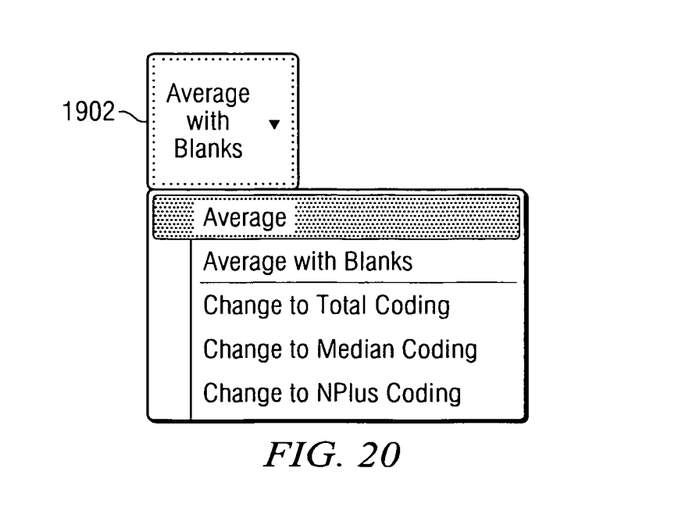

FIG. 20 is an illustration of an example user interface in which the volumetric join block 1902 has been selected. The user may request the block to be changed to any of the available options to control how parameter information is displayed.

Figure 21:
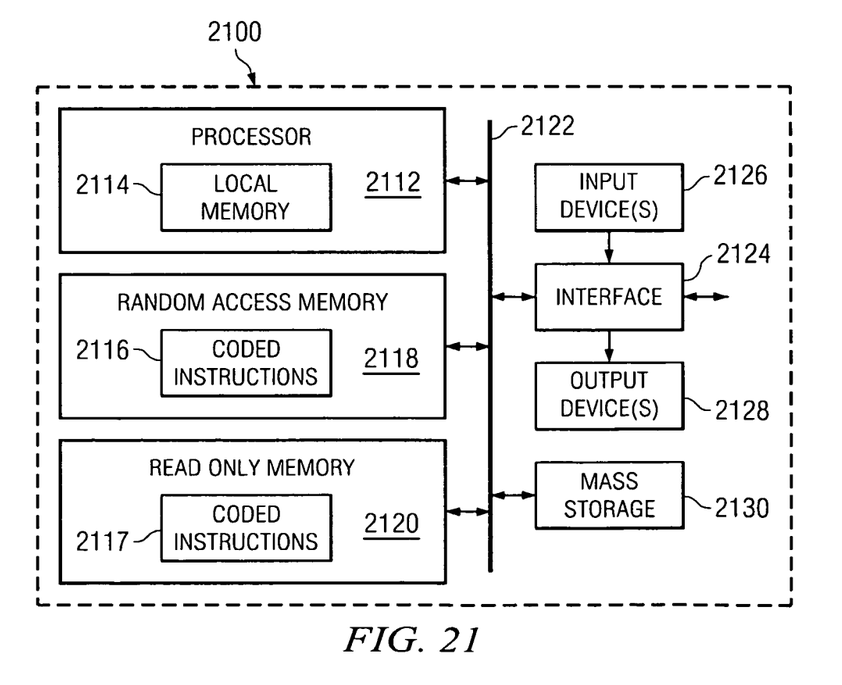
FIG. 21 is a block diagram of an example computer platform capable of executing the machine readable instructions illustrated in FIG. 2 to implement the system of FIG. 1, and/or the other apparatus and/or methods disclosed herein.

FIG. 21 is a block diagram of an example computer platform 2100 capable of executing the machine readable instructions illustrated in FIG. 2 to implement the example datastore 102, selection receiver 104, counter 106, content analyzer 108, modifier receiver 110, destination receiver 112, choice generator 114, rule store 118, chart generator 120, and/or display generator 122, and/or the other apparatus and/or methods disclosed herein. The system 100 of FIG. 1 can be implemented by any computer of software, firmware, and/or hardware.

The computer platform 2100 of the instant example includes a processor 2112 such as a general purpose programmable processor. The processor 2112 includes a local memory 2114, and executes coded instructions 2116 present in random access memory 2118, coded instruction 2117 present in the read only memory 2120, and/or instructions present in another memory device. The processor 2112 may execute, among other things, the machine readable instructions represented in FIG. 2. The processor 2112 may be any type of processing unit, such as a microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 2112 is in communication with a main memory including a volatile memory 2118 and a non-volatile memory 2120 via a bus 2122. The volatile memory 2118 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2120 may be implemented by flash memory and/or any other desired type of memory device. Access to the main memory 2118, 2120 is controlled by a memory controller (not shown).

The computer 2100 also includes an interface circuit 2124. The interface circuit 2124 may be implemented by any type of interface standard, such as an Ethernet interface, a universal serial bus (USB), and/or a third generation input/output (3GIO) interface.

One or more input devices 2126 are connected to the interface circuit 2124. The input device(s) 2126 permit a user to enter data and commands into the processor 2112. The input device(s) can be implemented by, for example, a keyboard, a mouse, a touchscreen, a track-pad, a trackball, isopoint and/or a voice recognition system.

One or more output devices 2128 are also connected to the interface circuit 2124. The output devices 2128 can be implemented, for example, by display devices (e.g., a liquid crystal display, a cathode ray tube display (CRT), a printer and/or speakers). The interface circuit 2124, thus, typically includes a graphics driver card.

The interface circuit 2124 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 2100 also includes one or more mass storage devices 2130 for storing software and data. Examples of such mass storage devices 2130 include floppy disk drives, hard drive disks, compact disk drives and digital versatile disk (DVD) drives.

The example system 100 of FIG. 1 implements a system for providing a choice selection with data presentation. The example system 100 enables users to prepare views of data without manually typing parameter identifiers. In particular, the example system allows a user to drag and drop survey answers onto a data grid for displaying the survey results. The system 100 of the illustrated example allows a user to develop complex information displays without analyzing text strings that are typically used to define data displays.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method to provide a choice selection to a user, the method comprising:
    determining a count of parameters to be included in a display of results of a survey, the count based on user selections;
    determining sources of the parameters;
    determining destinations in the display for the parameters, the destinations based on the user selections;
    retrieving a rule based on the destinations for the parameters, the count of the parameters, and the sources of the parameters; and
    based on the rule, presenting a choice matrix of the parameters for user selection, the choice matrix including choices related to how the results of the survey are to be displayed.

2. A method as defined in claim 1, further comprising displaying a list of available parameters.

3. A method as defined in claim 1, further comprising displaying the results of the survey in a results grid based on selected choices.

4. A method as defined in claim 1, further comprising receiving a selection of a choice from the choice matrix.

5. A method as defined in claim 1, wherein the choice matrix includes:
    a first choice to present a field including an intersection of the parameters; and
    a second choice to present a field for each of the parameters.

6. A method as defined in claim 1, wherein the determining of the sources of the parameters includes determining if the parameters are associated with a same source.

7. A method as defined in claim 1, wherein the determining of the sources of the parameters includes determining if the parameters are associated with a single survey question.

8. A method as defined in claim 1, further comprising determining if a user has requested a modifier.

9. A method as defined in claim 8, wherein the presenting of the choice matrix includes presenting an alternate choice matrix based on the requested modifier.

10. A method as defined in claim 1, wherein the user selections associated with the destinations include information associated with drag and drop operations of the parameters.

11. A method as defined in claim 10, wherein the determining of the destinations in the display is based on locations at which the user has dropped the parameters.

12. A method as defined in claim 11, wherein the presenting of the choice matrix includes displaying the choice matrix next to the locations.

13. A method as defined in claim 11, wherein the presenting of the choice matrix includes displaying a first choice above the locations and a second choice below the locations.

14. An apparatus comprising:
a counter to determine a count of parameters to be included in a display of results of a survey based on user selections;
a content analyzer to:
determine sources of the parameters; and
determine destinations in the display for the parameters, the destinations based on the user selections; and
a choice generator to:
retrieve a rule based on the destinations for the parameters, the count of the parameters, and the source of the parameters, and
present a choice matrix of the parameters for user selection based on the rule, the choice matrix including choices related to how the results of the survey are to be displayed, at least one of the counter, the content analyzer, and the choice generator comprising a hardware logic circuit.

15. An apparatus as defined in claim 14, further comprising a chart generator to generate a list of available parameters for display.

16. An apparatus as defined in claim 14, further comprising a display generator to display the results of the survey in a results grid based on selected choices.

17. An apparatus as defined in claim 14, further comprising a selection receiver to receive a selection of a choice from the choice matrix.

18. An apparatus as defined in claim 14, wherein the choice matrix includes:
a first choice to present a field comprising an intersection of the parameters; and
a second choice to present a field for each of the parameters.

19. An apparatus as defined in claim 14, wherein the content analyzer is to determine the sources of the parameters by determining if the parameters are associated with a same source.

20. An apparatus as defined in claim 14, wherein the content analyzer is to determine the sources of the parameters by determining if the parameters are associated with a single survey question.

21. A tangible machine readable storage disc or storage device comprising instructions that, when executed, cause a machine to at least:
determine a count of parameters selected by a user from a list of available parameters, the selected parameters to be included in a display of results of a survey;
determine sources of the parameters;
determine destinations in the display for the parameters, the destinations based on the user selections;
retrieve a rule based on the destinations for the parameters, the count of the parameters, and the sources of the parameters; and
present a choice matrix of the parameters for user selection based on the rule, the choice matrix including choices related to how the results of the survey are to be displayed, the rule indicating that parameters having a same question in the survey as a source are to be offered in the choice matrix as at least one of 1) a first combination of two or more parameters connected by an AND operator or 2) a second combination of the two or more parameters combined by an OR operator, the choice matrix displaying at least one of the first combination or the second combination.

22. A machine readable disc or storage device as defined in claim 21, wherein the instructions are further to cause the machine to display a list of available parameters.

23. A machine readable disc or storage device as defined in claim 21, wherein the instructions are further to cause the machine to display the results of the survey in a results grid based on selected choices.

24. A machine readable disc or storage device as defined in claim 21, wherein the instructions are further to cause the machine to receive a selection of a choice from the choice matrix.

25. A machine readable disc or storage device as defined in claim 21, wherein the choice matrix includes:
a first choice to present a field including an intersection of the parameters; and
a second choice to present a field for each of the parameters.

* * * * *